US008671263B2

(12) United States Patent
Jess

(10) Patent No.: US 8,671,263 B2
(45) Date of Patent: Mar. 11, 2014

(54) IMPLEMENTING OPTIMAL STORAGE TIER CONFIGURATIONS FOR A WORKLOAD IN A DYNAMIC STORAGE TIERING SYSTEM

(75) Inventor: Martin Jess, Erie, CO (US)

(73) Assignee: LSI Corporation, San Jose, CA (US)

( * ) Notice: Subject to any disclaimer, the term of this patent is extended or adjusted under 35 U.S.C. 154(b) by 533 days.

(21) Appl. No.: 13/020,046

(22) Filed: Feb. 3, 2011

(65) Prior Publication Data

US 2012/0203999 A1 Aug. 9, 2012

(51) Int. Cl.
*G06F 12/02* (2006.01)
*G06F 3/06* (2006.01)

(52) U.S. Cl.
CPC .................................. *G06F 3/0689* (2013.01)
USPC .................... 711/173; 711/114; 711/E12.002

(58) Field of Classification Search
None
See application file for complete search history.

(56) References Cited

U.S. PATENT DOCUMENTS 6,314,503 B1 * 11/2001 D'Errico et al. ............... 711/165
6,341,317 B1 * 1/2002 D'Errico et al. ................ 710/15
6,457,139 B1 * 9/2002 D'Errico et al. ............. 714/5.11
8,375,180 B2 * 2/2013 Chiu et al. ..................... 711/156
8,380,947 B2 * 2/2013 Chiu et al. ..................... 711/156
8,423,739 B2 * 4/2013 Ash et al. ....................... 711/165
2009/0198748 A1 * 8/2009 Ash et al. ....................... 707/204
2009/0198940 A1 * 8/2009 Ash et al. ....................... 711/165
2010/0199036 A1   8/2010 Siewert et al.
2010/0274827 A1  10/2010 Hix et al.
2011/0197046 A1 * 8/2011 Chiu et al. ..................... 711/171
2012/0215949 A1 * 8/2012 Chiu et al. ....................... 710/18

FOREIGN PATENT DOCUMENTS

WO      WO2010099992      9/2010

* cited by examiner

*Primary Examiner* — Kevin Verbrugge
(74) *Attorney, Agent, or Firm* — Suiter Swantz pc llo

(57) ABSTRACT

A method for Dynamic Storage Tiering (DST) may include identifying a first storage tier with a performance characteristic. The method may include monitoring the utilization of the first storage tier to detect the placement of a hot spot. The method may include logically dividing a continuous range of a plurality of logical addresses into at least a first segment and a second segment so the first segment includes a proportionally larger amount of the hot spot. The method may include moving the first segment into a second storage tier or moving the second segment into the second storage tier. The method may include determining an amount of utilization of the first storage tier by hot spots. The method may include recommending a change in an amount of storage space in the first storage tier based upon the amount of utilization of the first storage tier by the hot spots.

20 Claims, 4 Drawing Sheets

IMPLEMENTING OPTIMAL STORAGE TIER CONFIGURATIONS FOR A WORKLOAD IN A DYNAMIC STORAGE TIERING SYSTEM

TECHNICAL FIELD

The present disclosure generally relates to the field of electronic data storage, and more particularly to a system and method for providing computer accessible storage configured for Dynamic Storage Tiering (DST).

BACKGROUND

Dynamic Storage Tiering (DST) refers to the concept of grouping storage devices into tiers based upon their characteristics, and relocating data dynamically to leverage specific capabilities of the underlying devices. This requires that data is classified in some way so that the DST mechanism can place a particular data element into an "optimal" tier. DST can be applied to several different Quality of Service (QoS) attributes of a storage tier, such as DST based performance management. In the case of performance management, the DST objective is to identify data having a high activity level and place that data in high performing storage tiers. However, it may be equally important to identify data having a low activity level and place/keep that data in lower performing storage tiers. This may prevent the low activity level data from utilizing storage capacity in the higher performance storage pools. Further, the DST mechanism should perform these activities without taking any host data offline.

The DST system operation can be described as continuously placing (or keeping) data elements in the "right" storage tiers. For example, there may be n storage tiers and m data elements that need to be distributed in those storage pools to optimize the overall performance of the system. Thus, for a DST system to exhibit optimal performance characteristics, its storage tiers should be sized correctly for the actual workload. The intent is to have just enough storage capacity in the higher performing storage tiers to contain the data having the highest activity levels, which may be referred to as "hot spots." This may allow the DST system to appear to have the performance of a much more expensive storage configuration, such as a configuration where all the capacity in all of the tiers is provided by the higher performing storage, while the DST system actually utilizes a mix of higher and lower performing storage.

It may be very difficult for even an experienced system administrator to accurately predict the capacities that may be required in each storage tier in a DST system for a given workload, especially when multiple volumes or Logical Units (LU) are provisioned from the tiers. For example, the sizing of the storage tiers is typically performed manually and largely based upon an "educated guess." Then, once a DST system is installed and operating, the system administrator generally utilizes "trial and error" to optimize system operation. This may be done by adding or removing capacity from various storage tiers and then waiting to see what happens to overall system performance.

In the manual system sizing approach described above, the system administrator may overprovision the higher performing storage tiers so they have more capacity than what may actually be required for the workload, increasing the cost of the system unnecessarily. Alternatively, the system administrator may under provision the higher performing storage tiers and get a lower performance from the system than what may be possible with even a potentially small increment in the higher performing storage capacity. Further, the workload for a DST system may change over time, and a storage tier configuration that worked well initially may no longer provide optimal performance for the workload. Thus, it may be difficult for the system administrator to determine how a particular storage tier configuration should be changed to handle new workloads in an optimal way.

SUMMARY

Accordingly, the present disclosure is directed to a system and method for a DST system that monitors the utilization of its various storage tiers and the current placement of hot spots in those storage tiers so that a system administrator may easily determine how much capacity each tier should have to optimize system performance.

A method for providing computer accessible storage configured for Dynamic Storage Tiering (DST) may include using a computer or processor to perform the steps of identifying a first storage tier in a DST system with a performance characteristic, where storage space within the first storage tier is accessible via a plurality of logical addresses. The method may also include monitoring the utilization of the first storage tier to detect the placement of a hot spot stored within a continuous range of the plurality of logical addresses. The method may further include logically dividing the continuous range of the plurality of logical addresses into at least a first segment and a second segment so the first segment includes a proportionally larger amount of the hot spot than the second segment. The method may also include moving the first segment into a second storage tier and retaining the second segment in the first storage tier when the second storage tier has a more desirable performance characteristic than the first storage tier, and moving the second segment into the second storage tier and retaining the first segment in the first storage tier when the second storage tier has a less desirable performance characteristic than the first storage tier.

A system having computer accessible storage configured for DST may include a first storage tier having a first performance characteristic, where storage space within the first storage tier is accessible via a plurality of logical addresses. The system may also include a second storage tier having a second performance characteristic. The system may further include control programming configured for: monitoring the utilization of the first storage tier to detect the placement of a hot spot stored within a continuous range of the plurality of logical addresses; logically dividing the continuous range of the plurality of logical addresses into at least a first segment and a second segment so the first segment includes a proportionally larger amount of the hot spot than the second segment; and moving the first segment into the second storage tier and retaining the second segment in the first storage tier when the second performance characteristic is more desirable than the first performance characteristic, and moving the second segment into the second storage tier and retaining the first segment in the first storage tier when the second performance characteristic is less desirable than the first performance characteristic.

A method for providing computer accessible storage configured for DST may include using a computer or processor to perform the steps of identifying a first storage tier in a DST system with a performance characteristic, where storage space within the first storage tier is accessible via a plurality of logical addresses. The method may also include monitoring the utilization of the first storage tier to detect the placement of a first hot spot stored within a continuous range of the plurality of logical addresses, and to determine an amount of utilization of the first storage tier by a plurality of hot spots.

The method may further include logically dividing the continuous range of the plurality of logical addresses into at least a first segment and a second segment so the first segment includes a proportionally larger amount of the first hot spot than the second segment. The method may also include moving the first segment into a second storage tier and retaining the second segment in the first storage tier when the second storage tier has a more desirable performance characteristic than the first storage tier, and moving the second segment into the second storage tier and retaining the first segment in the first storage tier when the second storage tier has a less desirable performance characteristic than the first storage tier. The method may further include recommending a change in an amount of storage space in the first storage tier based upon the amount of utilization of the first storage tier by the plurality of hot spots.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1 through 7, a system including computer accessible storage configured for Dynamic Storage Tiering (DST) is described. In embodiments, the system includes multiple storage tiers, each one having different performance characteristics. One example performance characteristic includes latency, e.g., delays caused by distance between components, processing requirements, or the like. Another example performance characteristic includes bandwidth, e.g., data transmission rates, data carrying capacities, or the like. Further example performance characteristics may include I/O Operations Per Second (IOPS), which could be specified by read IOPS, write IOPS, and/or non-read/write IOPS. The system is configured for identifying tiers of the system with a performance characteristic, which may be supplied by, for example, a system administrator. Alternatively, the DST system may be configured to automatically determine performance characteristics for its storage tiers. In one specific example, a first storage tier may have a lower latency than a second storage tier, and the first storage tier may be designated as higher performing storage by the system.

Figure 1:
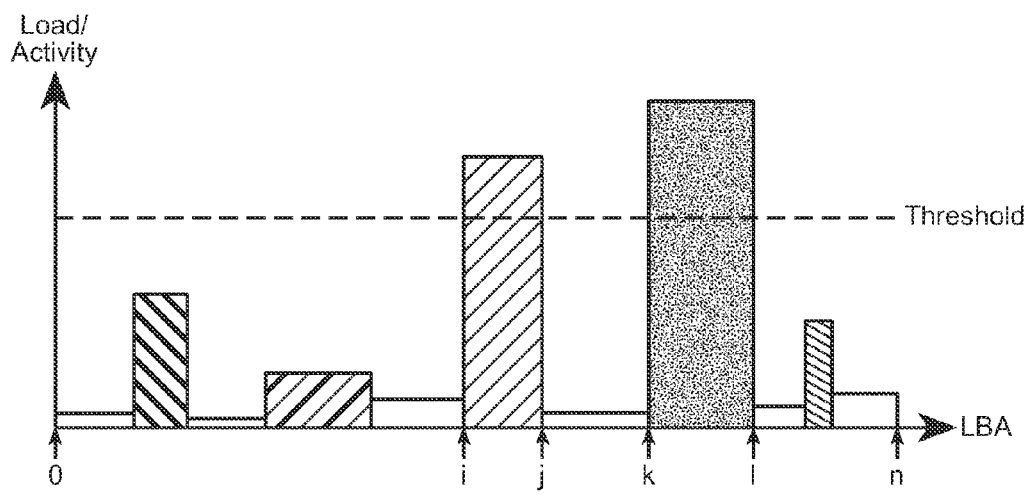
FIG. 1 is a graph illustrating hot spots detected utilizing a threshold activity level as specified in a DST system.

Referring now to FIG. 1, the storage space within the system may be logically divided for storage access and retrieval via a number of logical addresses. For example, a DST system may provision multiple volumes, or Logical Units (LU), from its various storage tiers. For a Small Computer System Interface (SCSI) LU, certain Logical Block Address (LBA) ranges of the LU may have a significantly higher level of Input/Output (I/O) activity (e.g., read and/or write operations) than the other LBAs of the LU. These LBA ranges may be referred to as "hot spots." In the specific example depicted in FIG. 1, LBA ranges [i . . . j] and [k . . . l] are particularly active, i.e., their activity level is above the threshold for what is considered a hot spot in the system. In some implementations, the threshold activity level may be defined as an absolute value, e.g., some number of I/Os Per Second (IOPS). Alternatively, the threshold level may be defined as a percentage relative to the average activity of a particular LU, a group of selected LUs, or all of the LUs in the system.

Figure 2:
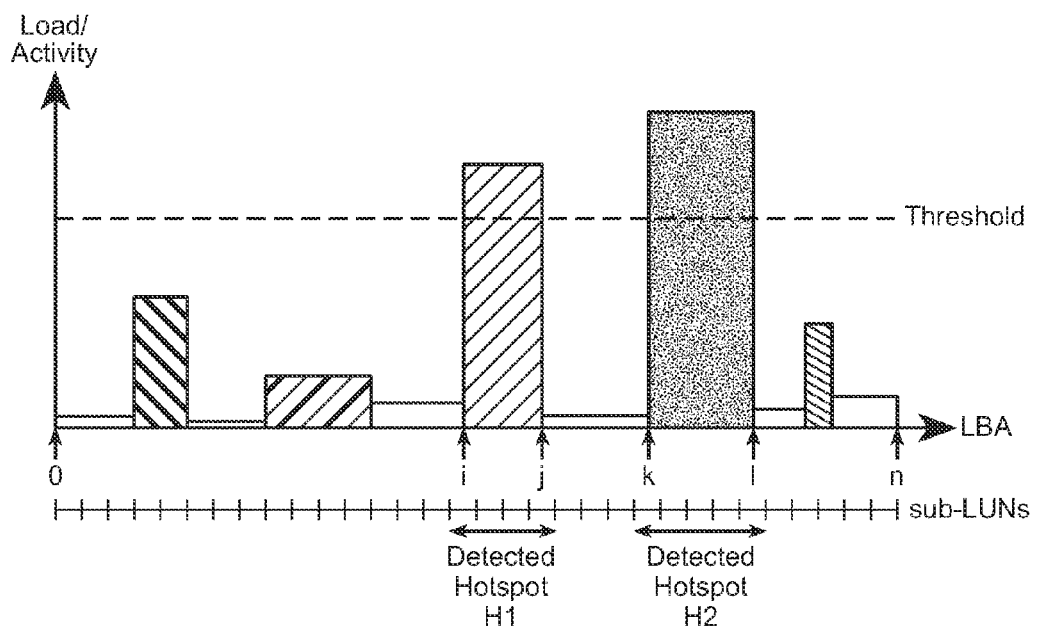
FIG. 2 is another graph of the hot spots illustrated in FIG. 1, where the DST system is logically divided into same sized sub-LUNs.

Referring to FIG. 2, in a DST system, hot spots may be detected by organizing the LBA range of an LU, which may be identified by a Logical Unit Number (LUN), into same sized sub-LUNs. Then, the DST system can measure load/activity for the sub-LUNs on an ongoing basis (over time), such as by collecting performance statistics for each individual sub-LUN over time. In specific implementations, the sub-LUN size may be defined either as a percentage of the overall LUN capacity, or as a fixed size (e.g., some number of megabytes). In the specific instance depicted in FIG. 2, hot spots H1 and H2 are detected as the sub-LUNs containing LBA ranges [i . . . j] and [k . . . l]. Because the activity monitoring is ongoing, some hot spots may "cool off" over time (i.e., the amount of activity associated with the hot spots may decrease), while other hot spots may appear as the workload changes over time. In some instances, workload changes may be cyclic, changing within, for example, a 24-hour cycle, a 5-day work week cycle, or a full 7-day week cycle. In other instances, workload changes may be more permanent, changing when, for example, a particular customer application is phased in or phased out of production.

Figure 3:
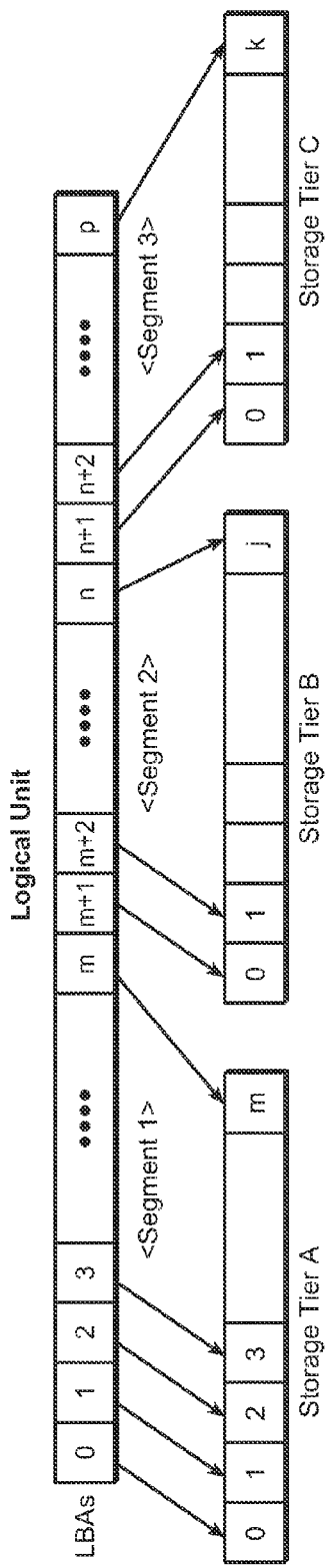
FIG. 3 is a schematic illustrating a DST system where storage space is provisioned from multiple storage tiers, which may have different performance characteristics.

Referring now to FIG. 3, an LU may be provisioned with storage capacity from one or more storage tiers. This may be done on an LBA range basis so that different LBA ranges in an LU can be provisioned with capacity in different storage tiers. Each mapping of an LU LBA range to a storage tier LBA range may be referred to as a segment. Each LU is fully provisioned when each LBA in its range is mapped to some LBA in a storage tier. In embodiments, the DST system includes a mechanism to change the segment configuration while the LU is online. Thus, the DST system can move the LU LBAs in a particular segment to another storage tier. Also, the DST system can change the LU segment configuration to include more segments or fewer segments.

Figure 4:
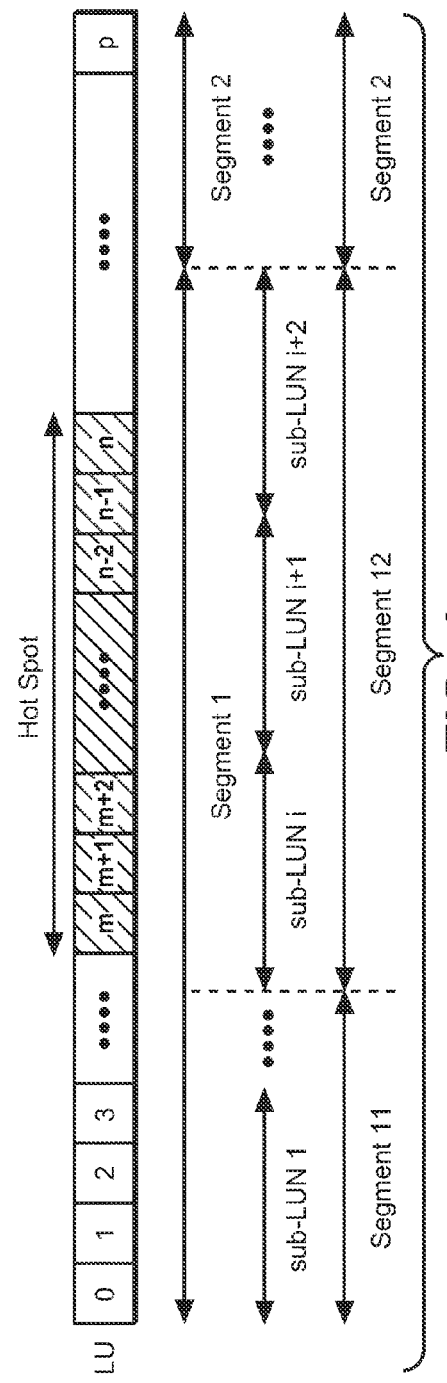
FIG. 4 is a schematic illustrating a number of sub-LUNs that have been logically organized into a number of segments, where one particular segment containing a hot spot is divided into two separate segments where one of the segments contains the hot spot.

Referring to FIG. 4, the DST system may be configured to contain detected hot spots in specific segments, which may then be moved to an optimal storage tier. In the specific example depicted in FIG. 4, a hot spot is detected in the LU LBA range [m . . . n] via sub-LUNs i through i+2. Initially, that hot spot may be contained in Segment 1, which may be a very large segment. The DST system may then reconfigure the LU segments by logically dividing Segment 1 into Segment 11 and Segment 12, such that Segment 12 contains the sub-LUNs associated with the hot spot (sub-LUNs i though i+2). In embodiments, this activity may be performed while the LU is online (i.e., fully accessible to initiators/hosts). The DST system is provided with an algorithm configured to determine the optimal storage tier for the newly detected hot spot, and it may then move Segment 12 to a different, higher performing storage tier, while keeping Segment 11 and Segment 2 in the current lower performing storage tier. This activity may be performed while the LU is online, as previously described. In some implementations, the DST system may be configured to maximize utilization of the higher performance storage tiers by filling them with data first, i.e., before filling the lower performance storage tiers with data. Further, the DST system may be configured to place/keep the hot spots in the various tiers such that utilization of the higher performing storage tiers is kept as high as possible.

When the hot spot depicted in FIG. 4 "cools off," i.e., the load on the corresponding LBA range falls below the threshold for some period of time, the DST system may move Segment 12 back to the lower performing storage tier. Again, this activity may be performed while the storage system is online. It should be noted that the DST system may detect more hot spots than are capable of fitting into the highest performing storage tier. In these instances, some hot spots may be placed in the second highest performing storage tier when there is free capacity available; otherwise, these hot spots may be placed in even lower performing storage tiers or not moved from their initial position in the storage system. However, when some of the most active LBA ranges are kept in lower performing storage tiers, it will be appreciated that there may be a large impact on overall system performance.

It should be noted that while the example depicted in the accompanying figures describes dividing one segment into two segments and moving a more frequently accessed segment into a higher performing storage tier, a segment may be divided into more than two segments. For example, a segment may be divided into three segments, four segments, or five or more segments. Further, it will be appreciated that more than one segment may be divided into multiple segments. For instance, two segments may be divided into four segments, and two of these segments may be moved to higher performing storage tiers. Additionally, when multiple segments are divided, two or more resulting segments may be combined into one or more new segments. For example, two segments may be divided into four segments, two of these segments may be combined into one segment, and the resulting segment may be moved to a higher performing storage tier.

It should also be noted that while the present disclosure has described dividing a segment into multiple segments and moving one or more of these segments into higher performing storage, one or more of the segments may also be moved to lower performing storage. For instance, as a certain LBA range of a hot spot cools off, the hot spot may be divided into multiple segments, and one or more of these segments may be moved to lower performing storage while the remaining portion of the hot spot that is still active may be kept in the higher performing storage. Further, as described above, multiple segments resulting from dividing two or more segments may be combined together into one or more segments, and the combined segments may be moved to a lower performing storage tier. Additionally, it should be noted that while a proportionally larger amount of the hot spot may be included in one or more segments resulting from a logical division, not all of the hot spot is necessarily included in the new segment(s), such as when insufficient storage space may be available in higher performance storage for containing the hot spot, but storing some of the hot spot may be beneficial nonetheless.

Figure 5:
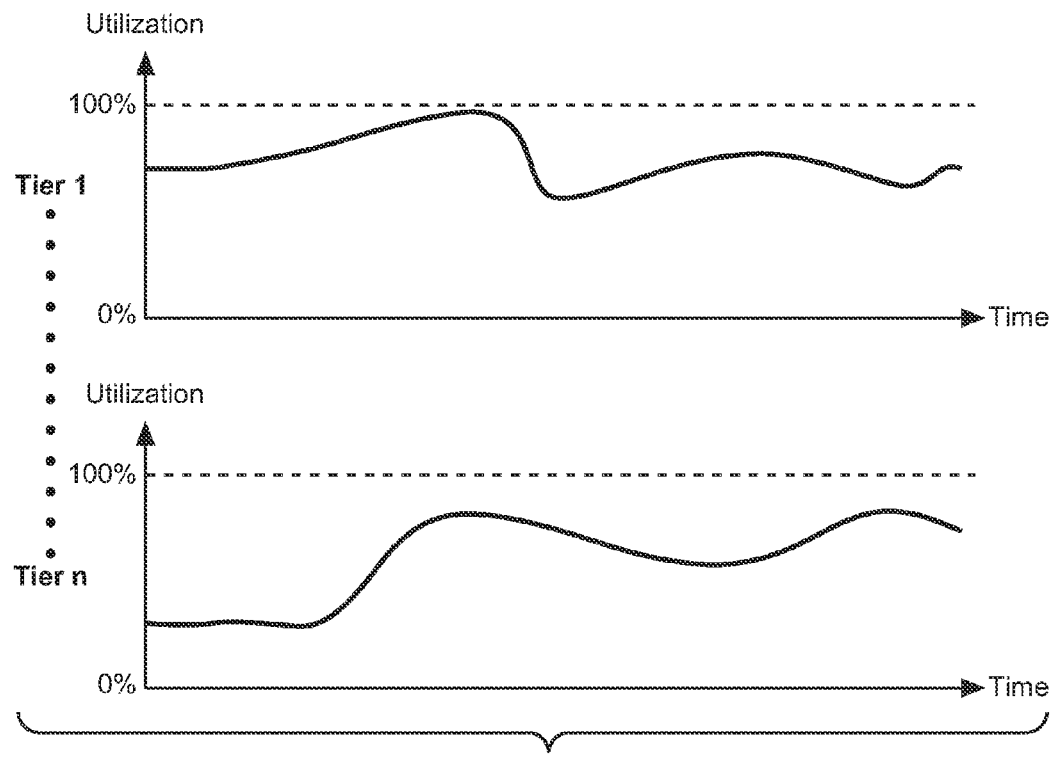
FIG. 5 is an illustration of graphs depicting the utilization of storage in different tiers of a DST system.
Figure 6:
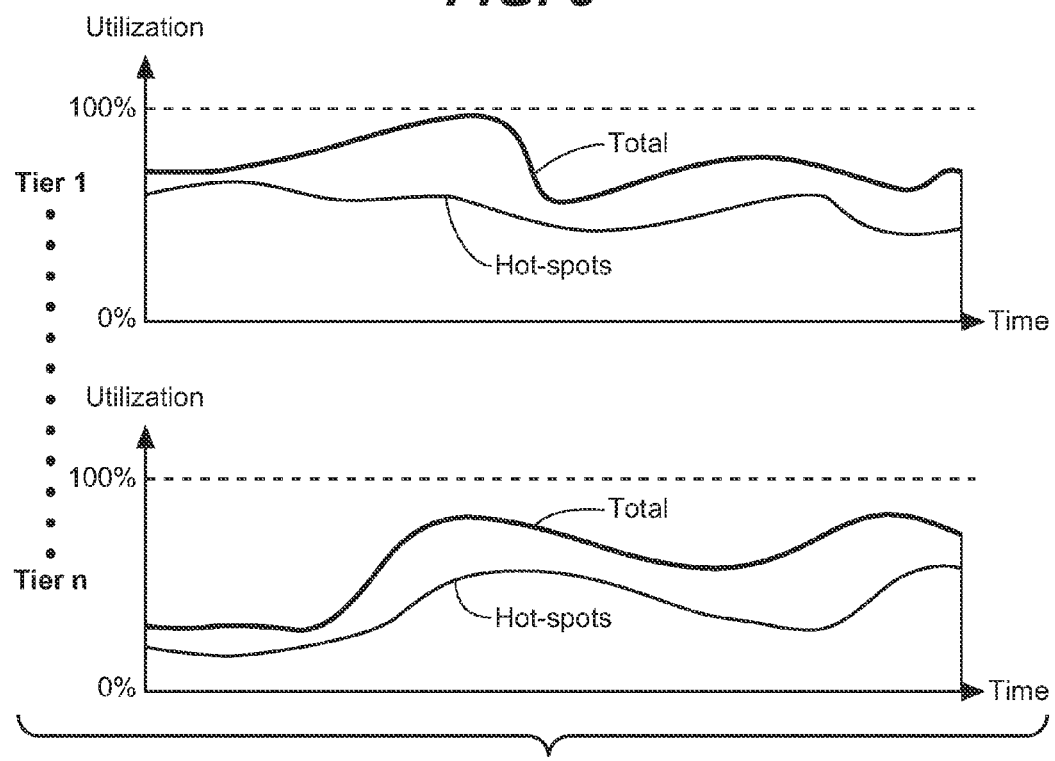
FIG. 6 is an illustration of graphs depicting the utilization of storage in different tiers of a DST system, where the amount of storage dedicated to storing hot spots is superimposed upon the overall storage in the tiers.

Referring now to FIGS. 5 and 6, monitoring functionality may be provided for the internal operation of the DST system. For example, monitoring may be provided to track the utilization of each storage tier in the DST system over time. Further, a display of the information collected while monitoring the DST system may be provided, which may be useful to, for example, a system administrator. In some embodiments, displays may be provided with utilization graphs, which may include, but are not limited to, utilization averages, maximum and/or minimum utilization data, and variances. In this manner, a system administrator, or another entity, may be provided with information on how the different storage tiers in the DST system are utilized. Accordingly, this information may allow a user to determine when any of the higher performing storage tiers are underutilized.

In many instances, it may be important for a system administrator to determine whether the utilization of higher performing storage tiers is actually due to the storage of hot spots. For example, because a DST system may be configured to maximize utilization of higher performing storage tiers, oftentimes data may be placed there that is not from a hot spot. Utilization graphs such as those depicted in FIG. 6 may be useful for determining which part of the utilization of each storage tier is for hot spots, and which is not.

For example, when the overall utilization of the highest performing storage tier is near 100% and all (or substantially all) of that utilization is hot spots, and there is a significant proportion of hot spots in the next highest performing storage tier, a system administrator may conclude that the DST system would benefit from the addition of high performing storage space. This additional storage space may be determined based upon the amount of capacity utilized by the hot spots in the second highest performing storage tier. By increasing the capacity of the highest performing storage tier, the DST system can then move hot spots from the second highest performing storage tier to the highest performing storage tier, increasing overall system performance. In another example, where the proportional hot spot utilization of the highest performing storage tier is low, and there are no hot spots in the second highest performing storage tier, a system administrator may conclude that the highest performing storage tier has more capacity for an actual workload than needed. Then, it may be desirable to move some of this higher performing storage space to another DST system.

In some embodiments, the DST system may be configured to log information about each change made to the storage tier configuration. For example, information may be logged regarding hot spots moved to higher performing storage tiers, as well as hot spots that cooled off and were moved to lower performing storage tiers. This information may be stored along with information indicating when these actions were performed, such as time stamp information, or the like. It is contemplated that this log information may be stored in persistent storage. For example, enough persistent storage space may be provided for the log information so the DST system can capture system behavior over a long enough period of time to capture relevant periodic changes. Specific examples may include enough persistent storage to capture changes over a 24-hour period, a 5-day work week period, a 7-day/weeklong period, a 4-week/monthlong period, or other relevant windows of time as required by one or more particular workloads. In embodiments, the log information may be utilized to generate data such as that illustrated in the displays depicted in FIGS. 5 and 6. This type of information may allow a system administrator (or another user) to understand the behavior of a DST system and make appropriate decisions about its configuration based upon that behavior.

In another example implementation, the DST system is configured to sample and log information about its utilization characteristics at regular intervals, rather than each time a change is made to the system. It is contemplated that in this type of implementation, data regarding the percentage of hot spots in the tiers may be collected and displayed as previously described.

In some implementations, the DST system may include an alert/notification mechanism. For example, the system administrator or another use may set upper and lower thresholds for hot spot utilization in one or more storage tiers. When the hot spot utilization of a particular tier passes a lower threshold, an alert may be sent. The alert may be in the form of an email, a page, a text message, or some other type of automatic communication. Alternatively, when the hot spot utilization of a particular tier passes an upper threshold, an alert may be sent. Thus, a user may be notified as the workload changes over time, and a particular storage tier becomes underutilized and/or over utilized.

In still further implementations, the DST monitoring tool may be combined with a rules based expert system (or another type of algorithm) for making recommendations for reconfiguring a DST system based on utilization information gathered by the DST tool. For example, an expert system may be configured to interpret monitoring data for a system administrator and provide recommendations on how to change a DST system configuration to achieve better price and/or performance characteristics. In a specific instance, an expert system may be configured with a rule set including parameters on an ideal percentage of hot spot storage for a higher performing storage tier that enables the expert system to recommend a specific number of megabytes of storage that could be added to a DST system for a specific workload.

Figure 7:
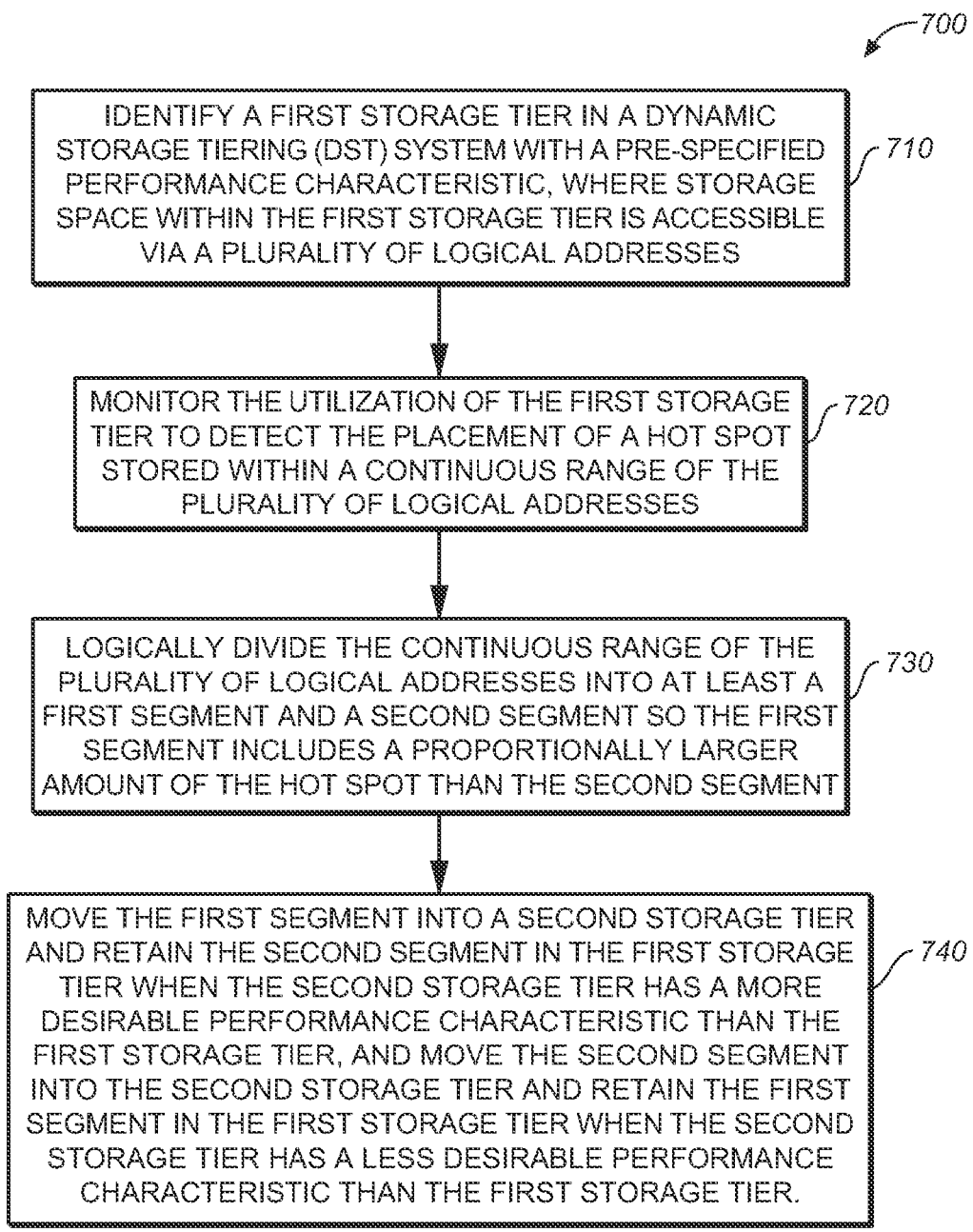
FIG. 7 is a flow diagram illustrating a method for providing computer accessible storage configured for DST.

Referring now to FIG. 7, a method 700 for providing computer accessible storage configured for Dynamic Storage Tiering (DST) is described in accordance with the present disclosure. The method 700 may include using a computer or processor to perform the steps of identifying a first storage tier in a DST system with a performance characteristic, where storage space within the first storage tier is accessible via a plurality of logical addresses, 710. The method may also include monitoring the utilization of the first storage tier to detect the placement of a hot spot stored within a continuous range of the plurality of logical addresses, 720. The method may further include logically dividing the continuous range of the plurality of logical addresses into at least a first segment and a second segment so the first segment includes a proportionally larger amount of the hot spot than the second segment, 730. The method may also include moving the first segment into a second storage tier and retaining the second segment in the first storage tier when the second storage tier has a more desirable performance characteristic than the first storage tier, and moving the second segment into the second storage tier and retaining the first segment in the first storage tier when the second storage tier has a less desirable performance characteristic than the first storage tier, 740.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
using at least one computer or processor to perform the steps of
identifying at least a first storage tier of a plurality of storage tiers in a Dynamic Storage Tiering (DST) system, each storage tier having a performance characteristic, where storage space within the first storage tier is accessible via a plurality of logical addresses;
monitoring at least one of the utilization of the plurality of storage tiers and the functionality of the DST system;
detecting the placement of a hot spot stored within a continuous range of the plurality of logical addresses corresponding to the first storage tier;
logically dividing the continuous range of the plurality of logical addresses into at least a first segment and a second segment so the first segment includes a proportionally larger amount of the hot spot than the second segment;
moving the first segment into a second storage tier and retaining the second segment in the first storage tier when the second storage tier has a more desirable performance characteristic than the first storage tier, and moving the second segment into the second storage tier and retaining the first segment in the first storage tier when the second storage tier has a less desirable performance characteristic than the first storage tier;
storing at least one data element associated with monitoring at least one of the utilization of the plurality of storage tiers over time and the functionality of the DST system; and
analyzing the at least one data element to generate at least one determination associated with monitoring at least one of the utilization of the plurality of storage tiers over time and the functionality of the DST system, where the at least one determination is associated with at least one of utilization of higher performing storage tiers due to the storage of hot spots and utilization of higher performing storage tiers due to storage of data not from a hot spot.

2. The method of claim 1, wherein the performance characteristic includes at least one of input/output operations per second, latency, or bandwidth.

3. The method of claim 1, wherein the first segment of the continuous range of the plurality of logical addresses includes at least substantially all of the hot spot.

4. The method of claim 1, further comprising:
determining an amount of utilization of the first storage tier by a plurality of hot spots including the first hot spot.

5. The method of claim 4, further comprising:
providing a display indicating the amount of utilization of the first storage tier by the plurality of hot spots.

6. The method of claim 4, further comprising:
providing a notification when the amount of utilization of the first storage tier by the plurality of hot spots passes a threshold.

7. The method of claim 1, further comprising:
providing at least one recommendation associated with a change to the DST system based on monitoring at least one of the utilization of the plurality of storage tiers and the functionality of the DST system.

8. A system including computer accessible storage configured for Dynamic Storage Tiering (DST), comprising:
a plurality of storage tiers, including at least a first storage tier having a first performance characteristic, where storage space within the first storage tier is accessible via a plurality of logical addresses, and a second storage tier having a second performance characteristic; and
control programming configured for:
monitoring at least one of the utilization of the plurality of storage tiers and the functionality of the DST system;
detecting the placement of a hot spot stored within a continuous range of the plurality of logical addresses corresponding to the first storage tier;
logically dividing the continuous range of the plurality of logical addresses into at least a first segment and a second segment so the first segment includes a proportionally larger amount of the hot spot than the second segment;
moving the first segment into the second storage tier and retaining the second segment in the first storage tier when the second performance characteristic is more desirable than the first performance characteristic, and moving the second segment into the second storage tier and retaining the first segment in the first storage tier when the second performance characteristic is less desirable than the first performance characteristic;
storing at least one data element associated with monitoring at least one of the utilization of the plurality of storage tiers over time and the functionality of the DST system; and
analyzing the at least one data element to generate at least one determination associated with monitoring at least one of the utilization of the plurality of storage tiers over time and the functionality of the DST system, where the at least one determination is associated with at least one of utilization of higher performing storage tiers due to the storage of hot spots and utilization of higher performing storage tiers due to storage of data not from a hot spot.

9. The system of claim 8, wherein the first performance characteristic and the second performance characteristic include at least one of input/output operations per second, latency, or bandwidth.

10. The system of claim 8, wherein the first segment of the continuous range of the plurality of logical addresses includes at least substantially all of the hot spot.

11. The system of claim 8, wherein the control programming is configured for determining an amount of utilization of the first storage tier by a plurality of hot spots including the first hot spot.

12. The system of claim 11, wherein the control programming is configured for providing a display indicating the amount of utilization of the first storage tier by the plurality of hot spots.

13. The system of claim 11, wherein the control programming is configured for providing a notification when the amount of utilization of the first storage tier by the plurality of hot spots passes a threshold.

14. The system of claim 8, wherein the control programming is configured for providing at least one recommendation associated with a change to the DST system based on monitoring at least one of the utilization of the plurality of storage tiers and the functionality of the DST system.

15. A method, comprising:
using at least one computer or processor to perform the steps of
identifying at least a first storage tier of a plurality of storage tiers in a Dynamic Storage Tiering (DST) system, each storage tier having a performance characteristic, where storage space within the first storage tier is accessible via a plurality of logical addresses;
monitoring at least one of the utilization of the plurality of storage tiers and the functionality of the DST system;
detecting the placement of a first hot spot stored within a continuous range of the plurality of logical addresses corresponding to the first storage tier;
determining an amount of utilization of the first storage tier by a plurality of hot spots;
logically dividing the continuous range of the plurality of logical addresses into at least a first segment and a second segment so the first segment includes a proportionally larger amount of the first hot spot than the second segment;
moving the first segment into a second storage tier and retaining the second segment in the first storage tier when the second storage tier has a more desirable performance characteristic than the first storage tier, and moving the second segment into the second storage tier and retaining the first segment in the first storage tier when the second storage tier has a less desirable performance characteristic than the first storage tier;
storing at least one data element associated with monitoring at least one of the utilization of the plurality of storage tiers over time and the functionality of the DST system;
analyzing the at least one data element to generate at least one determination associated with monitoring at least one of the utilization of the plurality of storage tiers over time and the functionality of the DST system, where the at least one determination is associated with at least one of utilization of higher performing storage tiers due to the storage of hot spots and utilization of higher performing storage tiers due to storage of data not from a hot spot; and
providing at least one recommendation associated with a change to the DST system based on monitoring at least one of the utilization of the plurality of storage tiers and the functionality of the DST system.

16. The method of claim 15, wherein the performance characteristic includes at least one of input/output operations per second, latency, or bandwidth.

17. The method of claim 15, wherein the first segment of the continuous range of the plurality of logical addresses includes at least substantially all of the first hot spot.

18. The method of claim 15, further comprising:
providing a display indicating the amount of utilization of the first storage tier by the plurality of hot spots.

19. The method of claim 15, further comprising:
providing a notification when the amount of utilization of the first storage tier by the plurality of hot spots passes a threshold.

20. The method of claim 15, wherein the first hot spot stored within the continuous range of the plurality of logical addresses is defined as a range of logical block addresses.

* * * * *